May 21, 1940.  R. H. VARIAN  2,201,460
METALLIC REDUCTION PROCESS
Filed Aug. 12, 1938
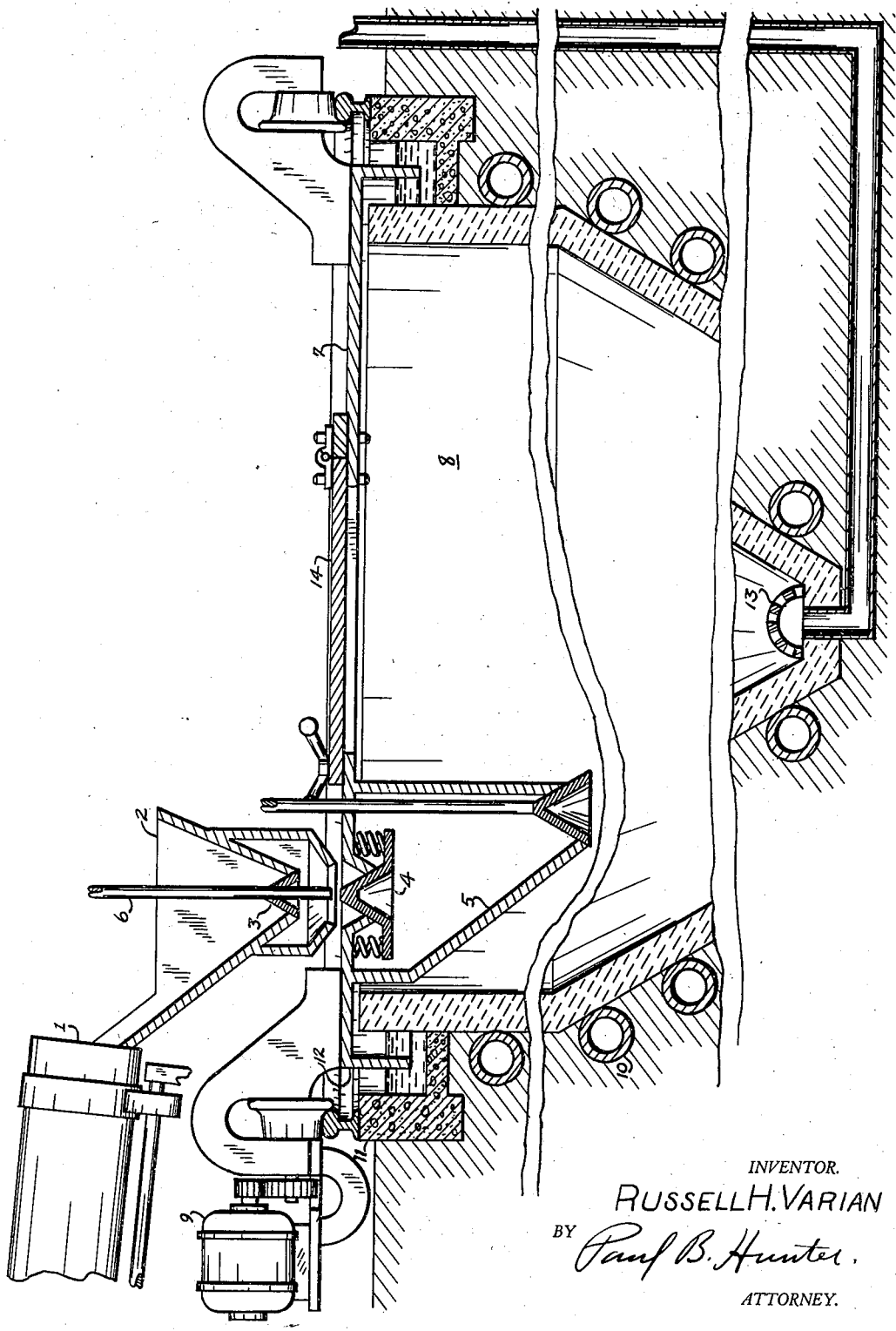
INVENTOR.
RUSSELL H. VARIAN
BY Paul B. Hunter.
ATTORNEY.

Patented May 21, 1940

2,201,460

UNITED STATES PATENT OFFICE 2,201,460

METALLIC REDUCTION PROCESS

Russell H. Varian, Stanford University, Calif.

Application August 12, 1938, Serial No. 224,521

11 Claims. (Cl. 75—33)

This invention relates, generally, to the reduction of metals and has reference more particularly to a novel process and means for the reduction of metals particularly of the iron group, at temperatures in which the metals are in the solid state, the said invention being particularly adapted for the production of sponge iron.

Processes heretofore developed for the production of sponge iron have not proven generally satisfactory in use because of the relatively high coke and fuel costs involved in these processes. In most of these prior processes it is necessary to supply large amounts of heat to poorly conducting material such as a charge of crushed iron ore and coke for a period of hours. This requires the retention of the charge in some such device as a rotating kiln during the entire course of the reaction, thus lowering the output, and greatly increasing the cost per unit of product.

The principal object of the present invention is to provide a novel metal reduction process especially adapted for the production of sponge iron either in small or large quantities which is highly efficient and economical in use owing partially to the fact that the same as a whole is exothermic due to the addition of a supplementary exothermic reaction to a process which is otherwise endothermic.

Another object of the present invention lies in the provision of a novel metallic reduction process and means wherein the cost of equipment used is less than that heretofore possible, the process of this invention merely requiring the use of a heat exchanging apparatus to heat up the charge, which latter is then removed from the heat exchanging apparatus and then disposed so as to retain its heat until the reaction is complete.

Still another object of the present invention is to provide a metallic reduction process of the above character in which a variety of fuels including crude oil may be used for a major portion of the process, e. g. heating the charge, and calcining the lime, the fixed carbon used for the reduction proper as in other sponge iron processes being of any character though the quantity required is much less in carrying out the present invention than for other sponge iron processes.

A further object of the present invention is to provide a novel metallic reduction process of the above character operating to leave certain harmful ingredients contained in the ore unreduced and hence in a substantially harmless condition, while removing sulphur from the reduced iron without an extra process step.

A still further object of the present invention lies in the provision of a novel process of the above character that serves to separate certain metals occurring in combination in the ore by the reduction of one metal without the others, the reduced metal being separated, whereupon the other metal or metals is or are reduced, the said process being adapted to operate at a relatively low temperature thereby involving less expense in the upkeep of refractories.

Other objects and advantages will become apparent from the specification taken in connection with the accompanying drawing, the single figure of which shows the preferred apparatus used for carrying out the invention as disclosed.

In carrying out the novel process of this invention when utilized for producing sponge iron, hydrogen is caused to react with the oxygen of the iron ore to form water, which is then caused to react with hot carbon such as coke to again form hydrogen together with carbon-dioxide, the latter being then caused to react with lime to form calcium carbonate. No gases are removed from the system, the calcium oxide being sufficient in amount to absorb substantially all the carbon dioxide evolved in the process, and the reaction as a whole is exothermic and may be divided into two or more stages, the first of which may be represented by the following formulas:

1. $3Fe_2O_3 + H_2 \rightarrow 2Fe_3O_4 + H_2O$
2. $2H_2O + C \rightarrow CO_2 + 2H_2$
3. $CO_2 + CaO \rightarrow CaCO_3$ This first stage is highly exothermic even without the exothermic contribution of reaction 3, so that carbon dioxide may be evolved too rapidly to be taken up completely by the CaO, any such loss of $CO_2$, however, is not detrimental to the process.

If the reaction is caused to take place below approximately 570° C., the reaction will be completed in the second stage, in which stage there is a direct reduction from magnetite $Fe_3O_4$ to iron as follows:

1. $Fe_3O_4 + 4H_2 \rightarrow 3Fe + 4H_2O$
2. $2H_2O + C \rightarrow CO_2 + 2H_2$
3. $CO_2 + CaO \rightarrow CaCO_3$ However, should the reaction take place at a higher temperature than 570° C., the same will occur in two stages, producing first ferrous oxide and then iron from this oxide. The reduction of the iron by use of these two additional stages has been found in practice to be most likely to occur and is indicated by the following:

$$Fe_3O_4 + H_2 \rightarrow 3FeO + H_2O$$
$$2H_2O + C \rightarrow CO_2 + 2H_2$$
$$CaO + CO_2 \rightarrow CaCO_3$$
$$FeO + H_2 \rightarrow Fe + H_2O$$
$$2H_2O + C \rightarrow 2H_2 + CO_2$$
$$CaO + CO_2 \rightarrow CaCO_3$$

Thus according to these series of reactions representing two or three stages, the oxygen is taken from the iron oxide by successive steps of reduction. In this process there is a large amount of hydrogen present in equilibrium with water vapor. The presence of these ingredients serves to automatically remove sulphur should the ore contain this last harmful ingredient, as is usually the case with most ores. Either the hydrogen or the water vapor may react with iron sulphide to form hydrogen sulphide which in turn will react with lime to form calcium sulphide as indicated by the following:

1. $FeS + H_2O \rightarrow FeO + H_2S$
   $H_2S + CaO \rightarrow CaS + H_2O$
2. $FeS + H_2 \rightarrow Fe + H_2S$
   $H_2S + CaO \rightarrow CaS + H_2O$ Since the transfer of sulphur to the calcium of calcium oxide is a strongly exothermic reaction, the sulphur is eventually practically all transferred to calcium sulphide.

Referring to W. G. Mellor's comprehensive treatise on Inorganic Chemistry, volume 12, p. 625, Fig. 26, the equilibrium pressures of carbon in contact with iron oxide and iron are given for a range of temperatures, these pressures being the combined pressures of CO and $CO_2$. In vol. 3, p. 654, of this same treatise, the equilibrium pressure of $CO_2$ in contact with CaO and $CaCO_3$ is given. Comparing these two sets of data it is found that the pressure of CO and $CO_2$ in contact with iron oxide and iron is much higher than the pressure of $CO_2$ in contact with CaO and $CaCO_3$. Since $CO_2$ forms a large part of the total pressure in equilibrium with iron, iron oxide and carbon, the pressure of $CO_2$ in equilibrium with these materials is greater than the pressure of $CO_2$ in equilibrium with CaO and $CaCO_3$ at the same temperature. Hence, $CO_2$ will be evolved from the iron oxide and carbon and absorbed by the calcium oxide. This process continues until the iron oxide phase has completely disappeared.

The process of this invention is slightly exothermic thereby rendering it unnecessary to supply heat to the reacting mass during the course of the reaction, such heat being required to carry out prior sponge iron processes which are highly endothermic. Hence, the process of this invention can be carried out at relatively low temperatures and slow reaction rates because, by the use of suitable insulation, the amount of heat loss taking place during the process can be controlled. It is usually necessary in carrying out the process to use a heat exchange apparatus to heat up the charge which is then caused to retain its heat till the reaction is complete. If large quantities of ore are being reduced, this may require nothing more than piling the hot reacting materials in a large pit that is suitably covered. Under such conditions, reaction times running into weeks or even months may prove economical, the resulting product being in a highly pure state.

In carrying out the process of the present invention, use is preferably made of a rotary kiln 1 substantially of the type in use in the manufacture of cement. A charge of iron ore, coke and lime in the approximate proportions as follows: An amount of iron ore providing one part by weight of ferric oxide, an amount of coke providing at least 0.12 part by weight of fixed carbon, and at least 0.53 part by weight of lime, are put into the kiln 1 and the mixture is brought to a reacting temperature, from which kiln it may be discharged through conical discharge doors 3 and 4 into container 5. Door 4 is so arranged that when opening door 3 by depressing rod 6 door 4 also opens. After the charge is in container 5, the whole cover 7 of reaction chamber 8, from which chamber 5 is suspended, may be rotated by means of motor 9 so that the contents of container 5 may be discharged evenly throughout reaction chamber 8, so that chamber 8 may be evenly filled.

Chamber 8 is lined with suitable refractory material, and the whole chamber is sunk in the ground to minimize heat losses and prevent escape of the gases in equilibrium with the charge. A number of flues 10 surround chamber 8. Hot gases may be circulated through these flues to heat the walls of chamber 8 preparatory to introducing the first charge, and may be used during the course of the reaction to make up the heat lost by conduction. Some of the heat lost by conduction is supplied by the charge as the reaction is slightly exothermic. Electric heaters may take the place of the flues, if desired.

A cylindrical flange 12 projects into annular trough 11 which is filled with water or other liquid and forms a gas tight seal, though allowing the top to rotate freely. A vent 13 is provided at the bottom of reaction chamber 8 through which a hydrogen containing gas such as water vapor may be introduced to act as a catalyst of the reduction reaction as previously mentioned. Enough gas may be admitted continuously through this vent to prevent air from entering through door 4, thus avoiding danger of explosions in reaction chamber 8. A door 14 is provided in top 7 which can be opened for removal of the charge when the reaction is complete.

The apparatus as shown in the drawing is adapted for carrying out a batch process, the chamber 8 being filled with the reacting mixture and allowed to remain closed until the reaction is complete, the reaction temperature being maintained through suitable heat control by regulating the heat supplied through flues 10. After the reaction is complete the sponge iron and extraneous material is removed through a suitable opening 14 in the cover 7 as by the use of a clam shell shovel.

The process of the present invention is also adapted for continuous operation in which case the chamber 8 is made of suitable proportions so that the charge will settle uniformly and can be removed from the bottom of this chamber when the reaction is complete, additional new batches of material being added or supplied to the top of the chamber 8 from time to time.

When the hot charge is removed it is quickly screened to remove the lumps of calcium carbonate for re-calcining and the remainder of the charge is quickly quenched in water or cooled by other suitable means in the absence of atmospheric oxygen. One of the advantages of the low temperature operation possible when using the method of the present invention is that cooling may be done even in the presence of atmospheric oxygen provided such cooling is completed moderately quickly so that any re-oxidation of the iron is slight.

At the temperature of the reaction, no gases are driven out of the charge and the lime takes up the $CO_2$. The lime may be supplied in lumps and its conversion to calcium carbonate takes place without disintegration of the lumps and these lumps may be readily re-calcined so that the lime may be used over and over again with only such loss as results from powdering in re-calcining. In fact, by adding a suitable binder to the lime to prevent it from powdering while in the calcined state it is possible to use the lime again and again with almost no loss thereof.

No sintering of the charge takes place at the temperature of the reaction, even after weeks of heating. Hence, if the ore and coke are reduced to small size, the larger lumps of calcium carbonate may be separated from the rest of the charge when the reaction is completed by means of screening. The calcium carbonate is then recalcined and the iron separated from the remaining material by the use of a suitable magnetic separator as is well known to those skilled in the art.

It is not necessary to use coke for supplying the necessary carbon, but many suitable forms of carbon may be used, such as bituminous coal, gas coke, and lignite from which the gaseous content has been driven by suitable preheating in containers from which atmospheric oxygen is excluded.

The chemical tests of the sponge iron produced from the process of the present invention show the same to be in a highly pure form with substantially all the sulphur content of the original ore removed.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. The method of reducing iron ore comprising, heating the iron ore with a carbon containing material and lime, introducing a hydrogen containing material acting as a catalyst of the reduction process, a reaction taking place resulting in the reduction of the ore in the presence of the lime and in the production of calcium carbonate, and allowing the resultant reaction to continue at substantially atmospheric pressure until reduction is complete.

2. The method of reducing iron ore comprising heating a batch of iron ore, coke and lime at substantially atmospheric pressure to a reacting temperature, and maintaining the batch at this pressure and temperature in the presence of a hydrogen containing gas, whereby the iron ore is reduced and the lime is converted to carbonate, the hydrogen being regenerated.

3. That step in the process of reducing iron ore whereby sulphur is removed from such ore comprising the reaction of a hydrogen containing gas with the iron sulphide of the ore at atmospheric pressure to form hydrogen sulphide and then reacting this hydrogen sulphide so formed with lime to produce calcium sulphide and regenerating the hydrogen.

4. The method of producing sponge iron from iron ore by the use of a rotary kiln and a reaction chamber comprising heating a charge of iron ore, carbon containing material and lime to a temperature at which the combined pressures of carbon dioxide and carbon monoxide produced by said charge is below atmospheric pressure in said kiln, a reaction taking place resulting in the reduction of the ore in the presence of the lime and in the production of calcium carbonate, discharging said heated mixture into the reaction chamber and retaining the mixture therein at substantially atmospheric pressure until the iron ore is completely reduced.

5. The method of producing sponge iron from iron ore by the use of a rotary kiln and a reaction chamber comprising heating a charge of iron ore, carbon containing material and lime to a temperature of from approximately 500° C. to approximately 850° C. in said kiln, a reaction taking place resulting in the reduction of the ore in the presence of the lime and in the production of calcium carbonate, discharging said heated mixture into the reaction chamber and retaining the mixture therein at substantially atmospheric pressure until the iron ore is completely reduced.

6. The method of producing sponge iron from iron ore by the use of a rotary kiln and a reaction chamber comprising heating a charge of iron ore, carbon containing material and lime to a temperature at which the combined pressures of carbon dioxide and carbon monoxide produced by said charge is below atmospheric pressure in said kiln, a reaction taking place resulting in the reduction of the ore in the presence of the lime and in the production of calcium carbonate, discharging said heated mixture into the reaction chamber, retaining the mixture therein at substantially atmospheric pressure and at its initial temperature by supplying additional heat to said chamber to compensate for conducting losses, removing the charge when the reduction is complete and separating the reduced iron by magnetic separation.

7. The method of causing carbon to reduce a metallic oxide comprising heating said metallic oxide with carbon in the presence of a catalyst in the form of a fluid containing hydrogen to produce carbon dioxide, and lowering the concentration of said carbon dioxide to a point at which said reduction will go to completion at atmospheric pressure by addition of an oxide of an alkali earth metal which will form a carbonate with said carbon dioxide.

8. The method of causing carbon to reduce a metallic oxide comprising heating said metallic oxide with carbon and hydrogen serving as a catalyst at atmospheric pressure to produce carbon dioxide, and lowering the concentration of said carbon dioxide to a point at which said reduction will go to completion by addition of an oxide of an alkali metal which will form a carbonate with said carbon dioxide.

9. The method of causing carbon to reduce a metal of the iron group comprising heating said metal of the iron group with carbon in the presence of a reducing catalyst at atmospheric pressure, said catalyst comprising a fluid containing hydrogen, to produce carbon dioxide and lowering the concentration of said carbon dioxide to a point at which said reduction will go to completion by addition of calcium oxide which will form a carbonate with said carbon dioxide.

10. The method of reducing an oxide, comprising heating at atmospheric pressure a mixture of the oxide, fixed carbon and calcium oxide together in the presence of a catalytic agent in the form of a fluid containing hydrogen, the reaction between the first mentioned oxide and carbon forming carbon dioxide, substantially all of the carbon dioxide so formed reacting with said calcium oxide to form calcium carbonate, the amount of carbon present being sufficient to combine with substantially all the oxygen of the oxide to be reduced to form carbon dioxide, and the amount of calcium oxide present being sufficient to combine with substantially all the carbon dioxide so formed to form calcium carbonate.

11. The method of reducing an oxide having an equilibrium pressure of carbon dioxide in contact with carbon at substantially atmospheric pressure and at a reactable temperature at which carbon in contact with said oxide produces a pressure of carbon dioxide which is greater than the equilibrium pressure of carbon dioxide in contact with calcium oxide and calcium carbonate at the same temperature, such temperature being a reactable temperature for calcium oxide and carbon dioxide; comprising heating a mixture of said oxide in the presence of enough fixed carbon to combine with substantially all the oxygen in said oxide, to be reduced to form carbon dioxide together with enough calcium oxide to transform substantially all the carbon dioxide so formed into calcium carbonate, said mixture being heated at a temperature for which the combined pressure of carbon dioxide and carbon monoxide produced by said oxide to be reduced is below atmospheric pressure.

RUSSELL H. VARIAN.